(12) United States Patent  
Park

(10) Patent No.: US 8,648,502 B2
(45) Date of Patent: Feb. 11, 2014

(54) LINEAR VIBRATOR

(75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 353 days.

(21) Appl. No.: 13/080,110

(22) Filed: Apr. 5, 2011

(65) Prior Publication Data

US 2011/0241451 A1 Oct. 6, 2011

(30) Foreign Application Priority Data

Apr. 5, 2010 (KR) .................. 10-2010-0031056

(51) Int. Cl.
*H02K 33/00* (2006.01)
(52) U.S. Cl.
USPC ............................................. 310/25; 310/15
(58) Field of Classification Search
USPC .................... 310/81, 14, 15, 17, 20, 25, 36
See application file for complete search history.

(56) References Cited

U.S. PATENT DOCUMENTS

| 5,023,495 | A | * | 6/1991 | Ohsaka et al. ............. 310/12.15 |
| 7,355,305 | B2 | | 4/2008 | Nakamura et al. |
| 7,619,498 | B2 | * | 11/2009 | Miura ........................... 335/222 |
| 2005/0121984 | A1 | | 6/2005 | Nakamura et al. |
| 2011/0089772 | A1 | * | 4/2011 | Dong et al. ...................... 310/25 |
| 2011/0309691 | A1 | * | 12/2011 | Park et al. ....................... 310/25 |

FOREIGN PATENT DOCUMENTS

| CN | 101049594 A | 10/2007 |
| CN | 101345465 A | 1/2009 |
| CN | 101404437 A | 4/2009 |
| CN | 101486029 A | 7/2009 |
| CN | 101488697 A | 7/2009 |
| JP | 2001-238427 A | 8/2001 |
| JP | 2002-200460 A | 7/2002 |
| JP | 2010-051163 A | 3/2010 |
| KR | 10-2006-0120859 A | 11/2006 |

OTHER PUBLICATIONS

Office Action dated Feb. 7, 2013 in Chinese Application No. 201110085217.3, filed Apr. 6, 2011.
Office Action dated Oct. 24, 2013 in Chinese Application No. 201110085217.3, filed Apr. 6, 2011.

* cited by examiner

*Primary Examiner* — Dang Le
(74) *Attorney, Agent, or Firm* — Saliwanchik, Lloyd & Eisenschenk

(57) ABSTRACT

Disclosed is a linear vibrator, the vibrator including a case including a lower case and an upper case engaged with the lower case; a stator that is disposed on a bottom plate of the lower case and includes a coil block formed of coil wound in the horizontal direction to the bottom plate; a vibrator including a weight having a storage that is formed in a position corresponding to the coil block to store the coil block, a yoke to cover the storage of the weight, and first and second magnets that are disposed in the storage and on the coil block; and an elastic member that has one side fixed to external surfaces of the weight, the external surfaces facing each other, and the other side engaged with a side of the case facing the external surfaces of the weight, the other side facing the one side.

20 Claims, 3 Drawing Sheets

LINEAR VIBRATOR

CROSS-REFERENCE TO RELATED APPLICATION

This application claims the benefit under 35 U.S.C. §119 of priority to Korean Patent Application No. 10-2010-0031056, filed Apr. 5, 2010, which is hereby incorporated by reference in its entirety.

BACKGROUND OF THE DISCLOSURE

1. Field of the Invention

The present disclosure relates to a linear vibrator.

2. Description of the Related Art

Generally, a linear vibrator includes a coil disposed on the bottom of a case, a spring disposed on an upper surface of the case, a weight fixed to the spring and a magnet that is fixed to the weight and travels back and forth within the coil.

The linear vibrator in the art has a problem in that it vibrates in the longitudinal direction and accordingly becomes very thick, whereby it is difficult to apply the vibrator to micro electronic equipment such as a mobile phone.

BRIEF SUMMARY

The present disclosure provides a linear vibrator that vibrates in the horizontal direction to greatly reduce thickness.

In an embodiment of the present disclosure, a linear vibrator includes a case including a lower case and an upper case engaged with the lower case; a stator that is disposed on a bottom plate of the lower case and includes a coil block formed of coil wound in the horizontal direction to the bottom plate; a vibrator including a weight having a storage that is formed in a position corresponding to that of the coil block to store the coil block, a yoke to cover the storage of the weight, and first and second magnets that are disposed in the storage and on the coil block; and an elastic member that has one side fixed to external surfaces of the weight, the external surfaces facing each other, and the other side engaged with a side of the case facing the external surfaces of the weight, the other side facing the one side.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION

Figure 1:
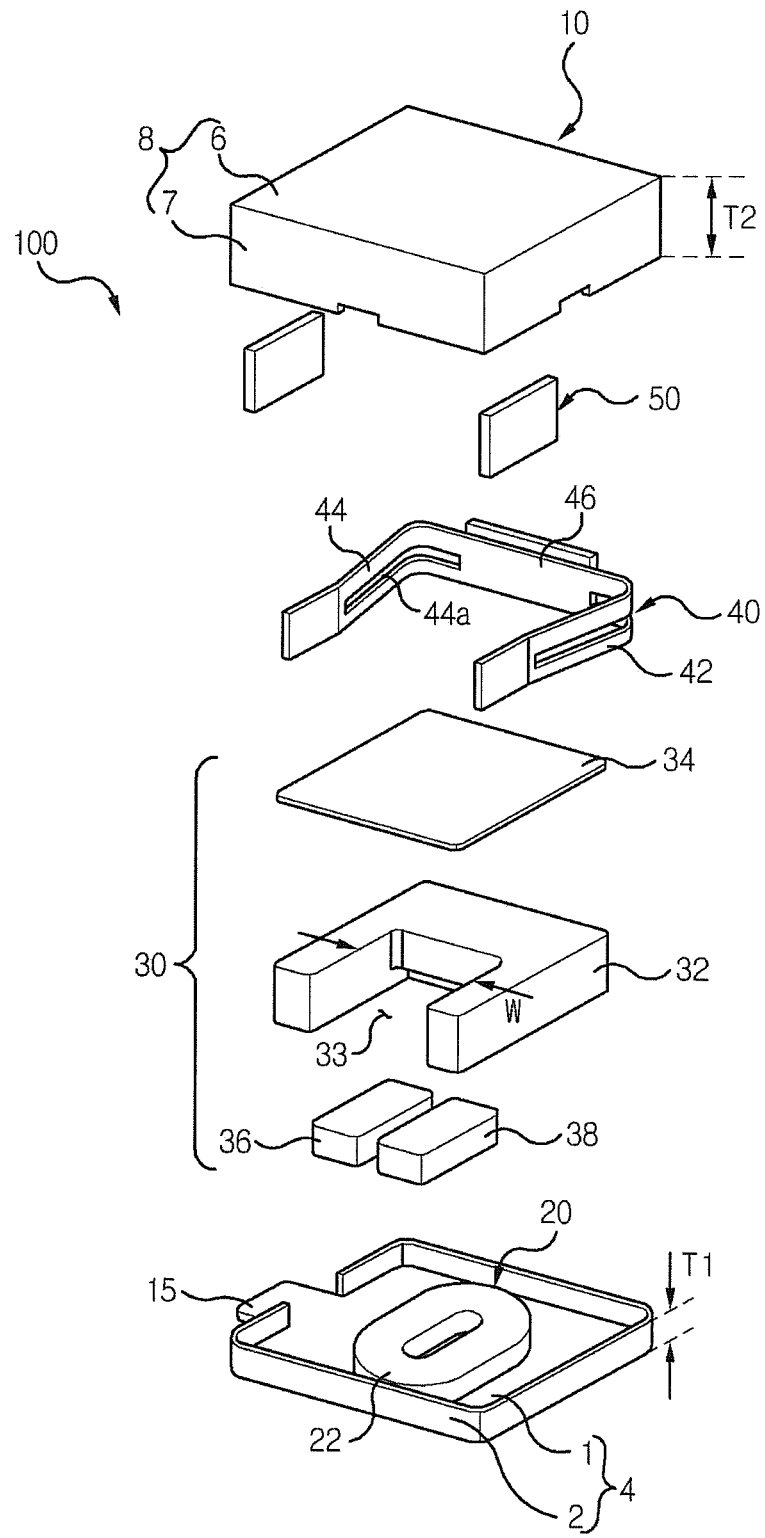
FIG. 1 is an exploded perspective view of a linear vibrator according to an embodiment of the present disclosure.

Hereinafter, embodiments of the present disclosure will be described with reference to the accompanying drawings. In this procedure, size and shape of the components shown in the drawings may be exaggerated for the sake of clarity and convenience. Further, terms that are specifically defined in consideration of construction and operation of the present disclosure may be changed according to operator's intention or custom. Definition of such items should be made on the basis of entire contents of the specification.

Figure 2:
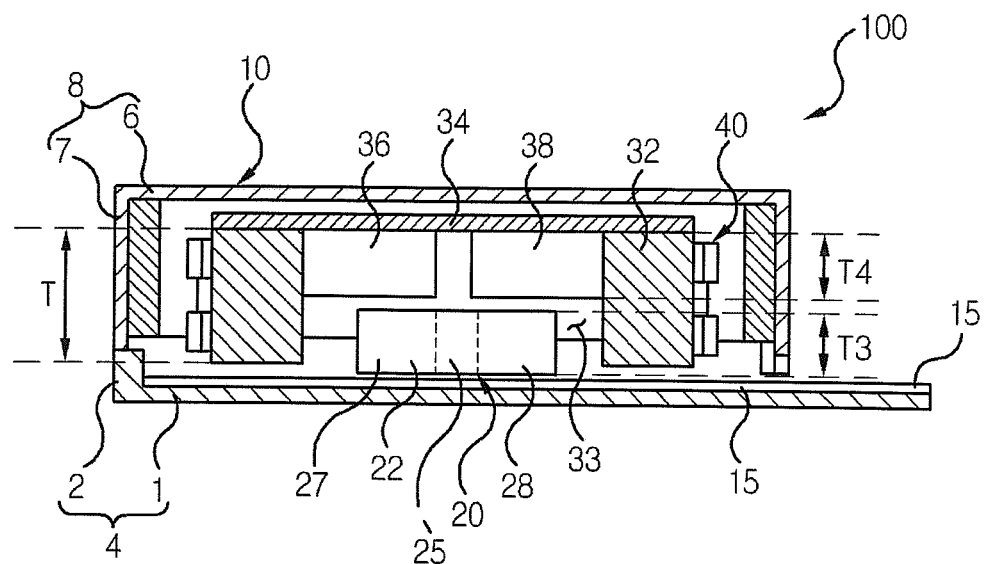
FIG. 2 is a sectional view of the linear vibrator illustrated in FIG. 1 when it has been assembled and then cut in the horizontal direction.

FIG. 1 is an exploded perspective view of a linear vibrator according to an embodiment of the present disclosure; FIG. 2 is a sectional view of the linear vibrator illustrated in FIG. 1, which has been assembled and then cut in the horizontal direction; and FIG. 3 is a perspective view illustrating a lower case, a circuit board and a coil block of FIG. 1.

Figure 3:
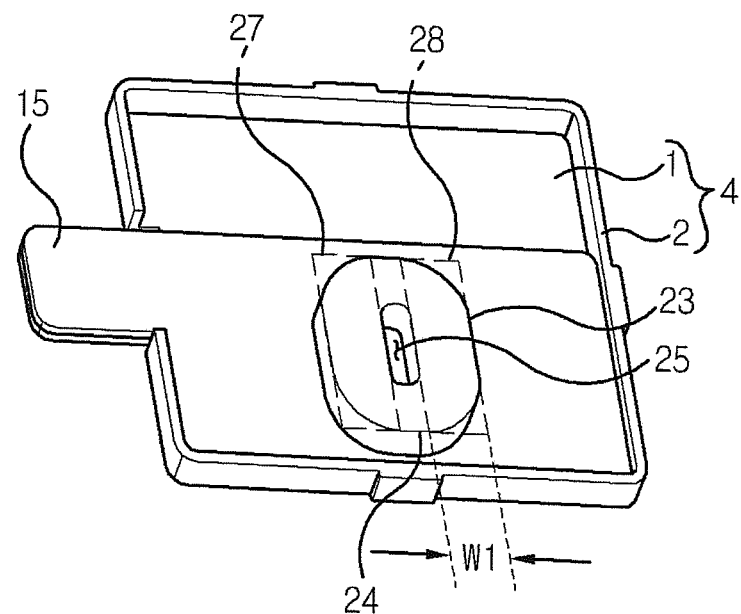
FIG. 3 is a perspective view illustrating a lower case, a circuit board and a coil block of FIG. 1.

Referring to FIGS. 1 to 3, a linear vibrator 100 includes a case 10, a stator 20, a vibrator 30 and an elastic member 40. In addition, the linear vibrator 100 may further include a shock absorbing member 50.

The case 10 includes a lower case 4 and an upper case 8.

The lower case 4 includes a bottom plate 1 and a side plate 2. The bottom plate 1 of the lower case 4 is formed in a rectangular plate shape, for example, and the side plate 2 is bent from edges of the bottom plate 1 in one direction so that storage is formed in the lower case 4. The side plate 2 of the lower case 4 may be formed to have a first height T1.

The upper case 8 includes a bottom plate 6 and a side plate 7. The bottom plate 6 of the upper case 8 faces the bottom plate 1 of the lower case 4, and the side plate 7 of the upper case 8 is bent toward the side plate 2 of the lower case 4 from the bottom plate 6. The side plate 7 of the upper case 8 may be formed to have a second height T2.

In an embodiment of the present disclosure, the side plate 2 of the lower case 4 and the side plate 7 of the upper case 8 are engaged with each other.

The stator 20 is disposed on the bottom plate 1 of the lower case 4, for example. In an embodiment of the present disclosure, the stator 20 includes a coil block 22 that is formed of coil wound in the horizontal direction to the bottom plate 1 of the lower case 4. In an embodiment of the present disclosure, the coil block 22 is formed to have a third height T3 as illustrated in FIG. 2.

The coil block 22 is disposed on the bottom plate 1 of the lower case 4, is formed of coil wound in the horizontal direction to the bottom plate 1, and is formed in a cylindrical shape with an opening.

Referring to FIG. 3, the coil block 22 according to an embodiment of the present disclosure is formed in a rectangular shape having a long side 23 and a short side 24, and an opening 25 of the coil block 22 formed in a cylindrical shape is formed in a rectangular shape due to a shape of the coil block 22.

In an embodiment of the present disclosure, when the coil block 22 is formed in a rectangular shape, an active area between the coil block 22 and first and second magnets to be described is increased, compared with that of a case that the coil block is formed in a cylindrical shape, so that it is possible to increase responsiveness of the first and second magnets a lot.

The coil block 22 is divided into a first coil portion 27 and a second coil portion 28 with the opening 25 as a boundary therebetween. In FIG. 3, the first coil portion 27 is defined as the coil block 22 disposed in the left side of the opening 25, and the second coil portion 28 is defined as the coil block 22 disposed in the right side of the opening 25. In an embodiment of the present disclosure, the first coil portion 27 and the second coil portion 28 each are formed to have a first width W1.

Referring to FIG. 2, a circuit board 15 is inserted between the coil block 22 formed by winding coil and the bottom plate 1 of the lower case 4, and the circuit board 15 includes a connection terminal that is electrically connected to the coil of the coil block 22. In an embodiment of the present disclosure, the circuit board 15 may be a thin flexible circuit board, and some of it is withdrawn out of the lower case 4 so that the circuit board 15 can be electrically connected to external equipment.

The vibrator 30 includes a weight 32, a yoke 34 and first and second magnets 36 and 38.

The weight 32 has a thick metal plate formed in a cuboid shape, and a storage 33 formed in a concave shape from one side of the weight 32. In the present embodiment, the storage 33 formed within the weight 32 has a width W that is greater than the sum of respective widths of the first and second magnets 36 and 38 to be described.

Meanwhile, the weight 32 may be formed to have a thickness T that is greater than the sum of a third height T3 of the coil block 22 and a thickness T4 of the first and second magnets 36 and 38 to be described, so that the coil block 22 and the first and second magnets 36 and 38 are stored all together in the storage 33 formed within the weight 32.

The yoke 34 plays a role to shield magnetic field generated from the first and second magnets 36 and 38, which is formed of a thin cuboid plate shape. The yoke 34 is fixed on the upper surface of the weight 32 facing the bottom plate 6 of the upper case 8, and one side of the storage 33 of the weight 32 is closed by the yoke 34.

Figure 4:
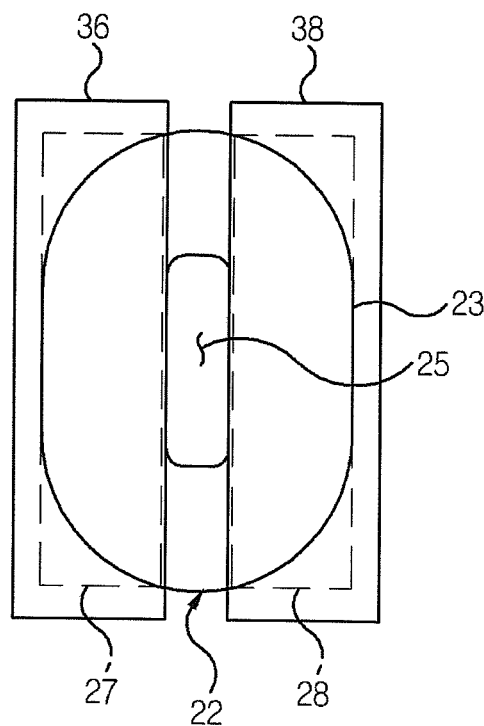
FIG. 4 is a plane view illustrating an arrangement of a coil block, first and second magnets in FIG. 1.

FIG. 4 is a plane view illustrating an arrangement of a coil block, first and second magnets in FIG. 1.

The first and second magnets 36 and 38 are fixed within the storage 33 of the weight 32.

The first and second magnets 36 and 38 are formed in a cuboid shape, for example, and fixed on the internal surface of the yoke 34 corresponding to the storage 33. Otherwise, the first and second magnets 36 and 38 each can be fixed to facing internal surfaces of the weight 32 that are formed by the storage 33.

The first and second magnets 36 and 38 are disposed on the coil block 22, so that they are disposed to face the coil block 22.

The first magnet 36 is disposed on the first coil portion 27 of the coil block 22, and the second magnet 38 is disposed on the second coil portion 28 of the coil block 22.

An end of the first magnet 36 that faces the first coil portion 27 of the coil block 22 is formed to have an N polarity, for example, and an end of the second magnet 38 that faces the second coil portion 28 of the coil block 22 is formed to have an S polarity, for example. Otherwise, an end of the first magnet 26 that faces the first coil portion 27 of the coil block 22 may be formed to have an S polarity, for example, and an end of the second magnet 38 that faces the second coil portion 28 of the coil block 22 may be formed to have an N polarity, for example.

When current is applied to the coil of the coil block 22 in the counter-clockwise direction, the first and second magnets 36 and 38 experience force acting in the right direction, according to Fleming's left-hand rule. On the contrary, when current is applied to the coil block 22 in the clockwise direction, the first and second magnets 36 and 38 experience force acting in the left direction when viewed from the plane, according to Fleming's left-hand rule.

That is, the first and second magnets 36 and 38 experience force acting in the left or right direction, according to the direction of current applied to the coil block 22.

Referring to FIG. 1 again, the elastic member 40 fixes the weight 32 of the vibrator 30 and vibrates it in a predetermined amplitude. The elastic member 40 may include a plate spring formed in 'U' shape, for example.

The elastic member 40 includes a first elastic portion 46 formed in a plate shape and second and third elastic portions 42 and 44 that are bent from both ends of the first elastic portion 46. The second and third elastic portions 42 and 44 are disposed to face each other. The second and third elastic portions 42 and 44 may have openings 42a and 44a formed in a slit shape.

The second and third elastic portions 42 and 44 of the elastic member 40 are engaged with both external surfaces of the weight 32 of the vibrator 30, respectively, and the first elastic portion 46 of the elastic member 40 is fixed on an internal surface of a side plate 7 of the upper case 8 that faces the weight 32. The weight 32 is tightly fixed to the upper case 8 using the elastic member 40.

Meanwhile, shock absorbing members 50 are disposed on the facing internal surfaces of the side plate 7 of the upper case 8 facing the second and third elastic portions 42 and 44 of the elastic member 40, respectively, and the shock absorbing members 50 inhibit a noise occurring when the second and third elastic portions 42 and 44 of the elastic member 40 that vibrate in the horizontal direction are directly in contact with the side plate 7 of the upper case 8.

In the present embodiment, the shock absorbing member 50 may be formed in a pad shape, for example, and include rubber, synthetic resin having an elasticity, and so on.

Figure 5:
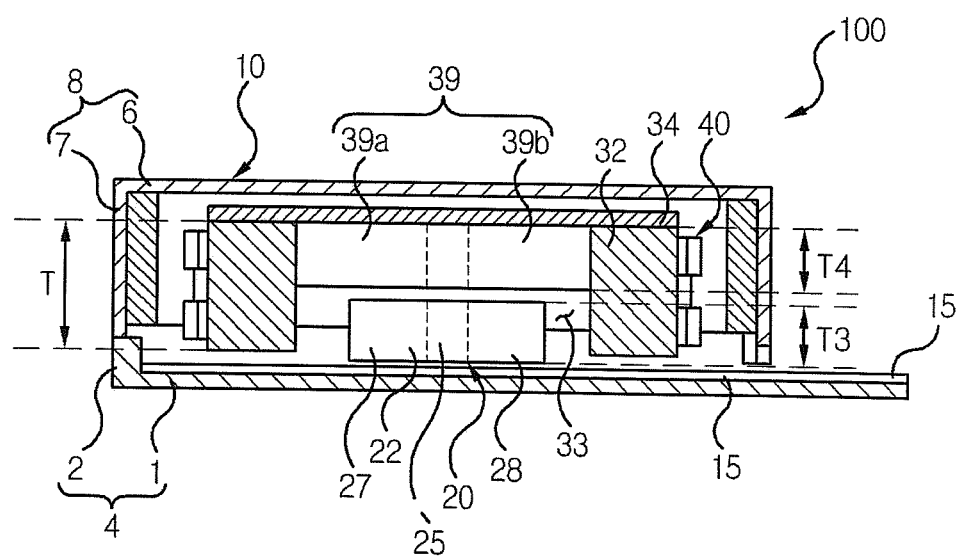
FIG. 5 is a sectional view illustrating a linear vibrator according to the other embodiment of the present disclosure.

FIG. 5 is a sectional view illustrating a linear vibrator according to the other embodiment of the present disclosure. The linear vibrator according to the other embodiment of the present disclosure has substantially the same construction as the linear vibrator illustrated and described in FIGS. 1 to 4 earlier except magnet. Accordingly, the same parts are designated by the same term and reference numeral and the explanation on them are omitted to avoid the duplication.

Referring to FIG. 5, a linear vibrator 100 includes a case 10, a stator 20, a vibrator 30 having a magnet 39 and an elastic member 40.

The magnet 39 is formed in a plate shape when viewed from the plane, and the magnet 39 formed in a plate shape includes a first magnet portion 39a and a second magnet portion 39b. That is, the first and second magnet portions 39a and 39b are formed in a body.

The first magnet portion 39a of the magnet 39 is disposed in a position corresponding to the first coil portion 27 of the coil block 22, and the second magnet portion 39b of the magnet 39 is disposed in a position corresponding to the second coil portion 28 of the coil block 22.

An end of the first magnet portion 39a facing the first coil portion 27 is formed to have a first polarity. In the present embodiment, the first polarity may be an N polarity, for example. An end of the second magnet portion 39b facing the second coil portion 28 is formed to have a second polarity that is opposite to the first polarity. In the present embodiment, the second polarity may be an S polarity, for example. Otherwise, an end of the first magnet portion 39a facing the first coil portion 27 may be formed to have the second polarity, and an end of the second magnet portion 39a facing the second coil portion 28 may be formed to have the first polarity.

The magnet 39 formed in a plate shape may be fixed to a yoke 34 that is fixed to the weight 32. Otherwise, the magnet formed in a plate shape may be fixed to a pair of the internal surfaces of the weight 32 that is formed of the storage 33 of the weight 32, the internal surfaces facing each other.

As described above in detail, there is an effect that the thickness of the linear vibrator can be decreased a lot by making the weight having the magnet fixed thereto vibrate in the horizontal direction when applying current to the coil block in the state that the coil block is disposed on the lower case, the weight having the magnet fixed thereto is disposed on the coil block, and the weight is fixed using the elastic member.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. A linear vibrator comprising:
    a case including a lower case and an upper case engaged with the lower case;
    a stator that is disposed on a bottom plate of the lower case and includes a coil block formed of coil wound in the horizontal direction to the bottom plate;
    a vibrator including a weight having a storage that is formed in a position corresponding to the coil block to store the coil block, a yoke to cover the storage of the weight, and first and second magnets that are disposed in the storage and above the coil block; and
    an elastic member including a first elastic portion fixed to the case, and a second elastic portion and a third elastic portion bent from both ends of the first elastic portion,
    wherein the second elastic portion and the third elastic portion are engaged with two external surfaces of the weight of the vibrator.

2. The linear vibrator according to claim 1, wherein the coil block is formed in a cylindrical shape with an opening.

3. The linear vibrator according to claim 2, wherein the first magnet is disposed above a first coil portion formed in one side of the opening of the coil block, and the second magnet is disposed above a second coil portion formed in the other side of the opening that faces the one side.

4. The linear vibrator according to claim 2, wherein the coil block is formed in a rectangular shape, and the opening of the coil block is formed in a slit shape.

5. The linear vibrator according to claim 4, wherein the first and second magnets are identical in length to that of the coil block formed in a rectangular shape.

6. The linear vibrator according to claim 4, wherein a gap between the first and second magnets is identical to a width of the opening of the coil block.

7. The linear vibrator according to claim 1, further comprising a circuit board inserted between the lower case and the coil block.

8. The linear vibrator according to claim 7, wherein the circuit board includes connection terminals that are electrically connected to ends of the coil of the coil block.

9. The linear vibrator according to claim 7, wherein the circuit board includes a flexible circuit board.

10. The linear vibrator according to claim 1, wherein the elastic member includes a plate spring that is bent in 'U' shape.

11. The linear vibrator according to claim 1, further comprising a shock absorbing member inserted between the weight and the internal surface of the case that faces the weight.

12. The linear vibrator according to claim 1, wherein the first and second magnets are fixed on the internal surface of the yoke.

13. The linear vibrator according to claim 1, wherein the first and second magnets are fixed on the internal surface of the weight formed by the storage of the weight.

14. A linear vibrator comprising:
    a case including a lower case and an upper case engaged with the lower case;
    a stator that is disposed on a bottom plate of the lower case and includes a coil block formed of coil wound in the horizontal direction to the bottom plate, the coil block being formed in a cylindrical shape;
    a vibrator including a weight having a storage that is formed in a position corresponding to that of the coil block to store the coil block, a yoke to cover the storage of the weight, and a magnet including a first magnet that is disposed above the coil block in the storage and has a first polarity and a second magnet that is disposed above the coil block in the storage, disposed adjacently to the first magnet and has a second polarity that is the opposite polarity; and
    an elastic member including a first elastic portion fixed to the case, and a second elastic portion and a third elastic portion bent from both ends of the first portion,
    wherein the second elastic portion and the third elastic portion are engaged with two external surfaces of the weight of the vibrator.

15. The linear vibrator according to claim 14, wherein the first magnet is disposed above a first coil portion of the coil block corresponding to one side of an opening formed in the coil block, and the second magnet is disposed above a second coil portion of the coil block corresponding to the other side of the opening.

16. The linear vibrator according to claim 14, wherein the coil block and the opening of the coil block each are formed in a rectangular shape.

17. The linear vibrator according to claim 16, wherein the first and second magnets are substantially identical in length to the coil block.

18. The linear vibrator according to claim 16, wherein a gap between the first and second magnets is identical to a width of the opening of the coil block.

19. The linear vibrator according to claim 14, wherein the magnet is fixed on an internal surface of the yoke.

20. The linear vibrator according to claim 14, wherein the magnet is fixed on an internal surface of the weight formed by the storage.

* * * * *